United States Patent
Funazukuri et al.

(10) Patent No.: US 11,210,060 B2
(45) Date of Patent: Dec. 28, 2021

(54) INTERACTION SYSTEM, INTERACTION METHOD, AND PROGRAM

(71) Applicant: Toyota Jidosha Kabushiki Kaisha, Toyota (JP)

(72) Inventors: Mina Funazukuri, Tokyo-to (JP); Tomoya Takatani, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/784,853

(22) Filed: Feb. 7, 2020

(65) Prior Publication Data
US 2020/0272413 A1 Aug. 27, 2020

(30) Foreign Application Priority Data
Feb. 26, 2019 (JP) .............................. JP2019-032549

(51) Int. Cl.
*G06F 3/048* (2013.01)
*G06F 3/16* (2006.01)
*B25J 11/00* (2006.01)

(52) U.S. Cl.
CPC ........... *G06F 3/167* (2013.01); *B25J 11/0005* (2013.01)

(58) Field of Classification Search
CPC .......... G06F 3/011; G06F 3/017; G06F 3/167; G06F 9/54; G06F 9/451; G06F 40/30; G06N 3/006; G06N 3/02; G06N 3/0454; G06N 20/00; G06N 3/08
See application file for complete search history.

(56) References Cited

U.S. PATENT DOCUMENTS

| | | | |
|---|---|---|---|
| 2015/0193111 A1* | 7/2015 | Kauffmann | G06F 3/0487 715/825 |
| 2019/0332400 A1* | 10/2019 | Spoor | G06F 9/453 |
| 2020/0075007 A1* | 3/2020 | Kawahara | G06K 9/00288 |
| 2020/0097247 A1* | 3/2020 | Molina | G06F 16/26 |

FOREIGN PATENT DOCUMENTS

JP 2017207693 A 11/2017

* cited by examiner

*Primary Examiner* — Claudia Dragoescu
(74) *Attorney, Agent, or Firm* — Dinsmore & Shohl LLP

(57) ABSTRACT

An interaction system capable of making a user form an attachment to a particular interaction model is provided. A first interaction model is configured so that a communication function expressed to a user is improved from an initial state through communication with the user. A second interaction model is configured to interact with the user by a communication function better than the initial state of the first interaction model, and to make a speech for the user, the speech being made so as to support the improvement of the communication function of the first interaction model.

7 Claims, 10 Drawing Sheets

FUNCTION INFORMATION

| FUNCTION | EXECUTION LEVEL |
|---|---|
| ROBOT OPERATION | EXECUTABLE |
| WEATHER FORECAST | NON-EXECUTABLE |
| TRANSFER GUIDE | NON-EXECUTABLE |
| EMOTIONAL EXPRESSION | NON-EXECUTABLE |
| USER LEARNING | LOW |
| WORD LEARNING | INTERMEDIATE |
| SPACE RECOGNITION | INTERMEDIATE |

RELEASE FUNCTION: ROBOT OPERATION, WEATHER FORECAST, TRANSFER GUIDE, EMOTIONAL EXPRESSION

LEARNING FUNCTION: USER LEARNING, WORD LEARNING, SPACE RECOGNITION

Fig. 5

LEARNING INFORMATION

USER INFORMATION

| FACE IMAGE | NAME | NUMBER OF CONTACTS | INTERACTION TIMING |
|---|---|---|---|
| FACE IMAGE X | Mr./Ms. X | SIX TIMES | 7PM ON WEEKDAYS |
| FACE IMAGE Y | Mr./Ms. Y | TWICE | — |
| FACE IMAGE Z | — | ONCE | — |
| ... | ... | ... | ... |

WORD INFORMATION

| WORD | MEANING |
|---|---|
| APPLE | FOOD |
| TOYOTA | NAME OF PLACE |
| GOOD MORNING | GREETING IN MORNING |
| ... | ... |

SPACE INFORMATION

| ROOM | MAP INFORMATION |
|---|---|
| ROOM A | MAP INFORMATION A |
| ROOM B | MAP INFORMATION B |
| ... | ... |

Fig. 6

INTERACTION SYSTEM, INTERACTION METHOD, AND PROGRAM

CROSS REFERENCE TO RELATED APPLICATIONS

This application is based upon and claims the benefit of priority from Japanese patent application No. 2019-032549, filed on Feb. 26, 2019, the disclosure of which is incorporated herein in its entirety by reference.

BACKGROUND

The present disclosure relates to an interaction system, an interaction method, and a program. In particular, the present disclosure relates to an interaction system, an interaction method, and a program for interacting with a user.

An interaction system that autonomously interacts with a user has been known. In relation to this technique, Japanese Unexamined Patent Application Publication No. 2017-207693 discloses an interaction system that leads, by means of two agents (robots), user's speech (i.e., user's talk) to within a range in which conditions for enabling the interaction system to acquire the user's speech are satisfied, and thereby continue the interaction (i.e., the conversation) with the user for a long time.

In the interaction system according to Japanese Unexamined Patent Application Publication No. 2017-207693, after a first agent presents a first speech, a second agent presents a speech for encouraging the user to speak in response to the first speech. As a result, by the speech of the second agent, the user's speech is led to within the range in which the conditions for enabling the interaction system to acquire the user's speech are satisfied. Therefore, by interacting with the user by using the two agents (two interaction models), the interaction system can smoothly interact with (i.e., smoothly talk with) the user.

SUMMARY

There are cases in which it is necessary to induce a user to have a strong attachment to a particular robot (a particular interaction model) by a sales promotion of the robot or the like. However, Japanese Unexamined Patent Application Publication No. 2017-207693 discloses nothing about how a user forms an attachment to the agent (the robot) that interacts with the user. Therefore, even if the technique disclosed in Japanese Unexamined Patent Application Publication No. 2017-207693 is used, it is difficult to perform control as to which of these two agents the user forms an attachment. For example, there is a possibility that although it is required that the user have a strong attachment to the first agent, the user actually could have an attachment to the second agent. Accordingly, it is desired to induce the user to form an attachment to a particular robot (a particular interaction model) in the interaction system.

The present disclosure provides an interaction system, an interaction method, and a program capable of making a user form an attachment to a particular interaction model.

A first exemplary aspect is an interaction system configured to communicate with a user at least through an interaction with the user, comprising at least a first interaction model and a second interaction model each of which is configured to at least interact with the user, in which the first interaction model is configured so that a communication function expressed to the user is improved from an initial state through communication with the user, and the second interaction model is configured to interact with the user by a communication function better than the initial state of the first interaction model, and to make a speech for the user, the speech being made so as to support the improvement of the communication function of the first interaction model.

Further, another exemplary aspect is an interaction method performed by using an interaction system configured to communicate with a user at least through an interaction with the user, the interaction method including: implementing a first interaction model configured so that a communication function expressed to the user is improved from an initial state through communication with the user, and implementing a second interaction model configured to interact with the user by a communication function better than the initial state of the first interaction model, and to make a speech for the user, the speech being made so as to support the improvement of the communication function of the first interaction model.

Further, another exemplary aspect is a program for performing an interaction method performed by using an interaction system configured to communicate with a user at least through an interaction with the user, the program being adapted to cause a computer to execute: a function of implementing a first interaction model configured so that a communication function expressed to the user is improved from an initial state through communication with the user, and a function of implementing a second interaction model configured to interact with the user by a communication function better than the initial state of the first interaction model, and to make a speech for the user, the speech being made so as to support the improvement of the communication function of the first interaction model.

By the above-described configuration, a user can nurture (i.e., bring up) the first interaction model by receiving the support of the second interaction model without depending on the state of the first interaction model. Therefore, the user can experience more reliably as if the first interaction model grows through the communication with the user. In this way, the user can form an attachment to the first interaction model.

Further, the second interaction model may acquire a state of the first interaction model and provides a support according to the state.

By the above-described configuration, the second interaction model can provide a more appropriate support. Therefore, the user can nurture the first interaction model more reliably.

Further, the second interaction model may provide a support when it is determined that the improvement of the communication function of the first interaction model is stagnating.

By the above-described configuration, the second interaction model can provide a support at an appropriate timing. Therefore, the user can nurture the first interaction model more reliably.

Further, the second interaction model may make a speech for the user for indicating an action that the user should perform to improve the communication function of the first interaction model.

According to the present disclosure, by configuring the interaction system as described above, the user can easily understand what he/she should do to nurture the first interaction model.

Further, the second interaction model may make the speech for indicating the action to the user by using a character string.

By configuring the interaction system as described above, the second interaction model can interact with the user more reliably. Therefore, the second interaction model and the user can perform smooth communication therebetween.

Further, at least the first interaction model may be implemented in the form of a virtual character in a user terminal. Further, the interaction system may further include an information transmission unit configured to transmit information about the improved communication function of the first interaction model to an actual communication robot corresponding to the first interaction model.

By configuring the interaction system as described above, the user can have such an experience that he/she communicates with the actual communication robot which physically embodies the virtual character that the user has nurtured, as an actual entity. Therefore, the user can form a strong attachment to the actual communication robot.

Further, the degree of the improvement of the communication function of the second interaction model may be smaller than that of the first interaction model.

By configuring the interaction system as described above, it is possible to prevent the user from forming an attachment to the second interaction model. Therefore, the user can reliably form an attachment to the first interaction model.

According to the present disclosure, it is possible to provide an interaction system, an interaction method, and a program capable of making a user form an attachment to a particular interaction model.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 shows an example of function information stored in a function database according to the first embodiment;

FIG. 6 shows an example of learned information stored in a learned information storage unit according to the first embodiment;

DESCRIPTION OF EMBODIMENTS

First Embodiment

Embodiments according to the present disclosure will be described hereinafter with reference to the drawings. Note that the same symbols are assigned to the same elements throughout the drawings and duplicated explanations are omitted as appropriate.

Figure 1:
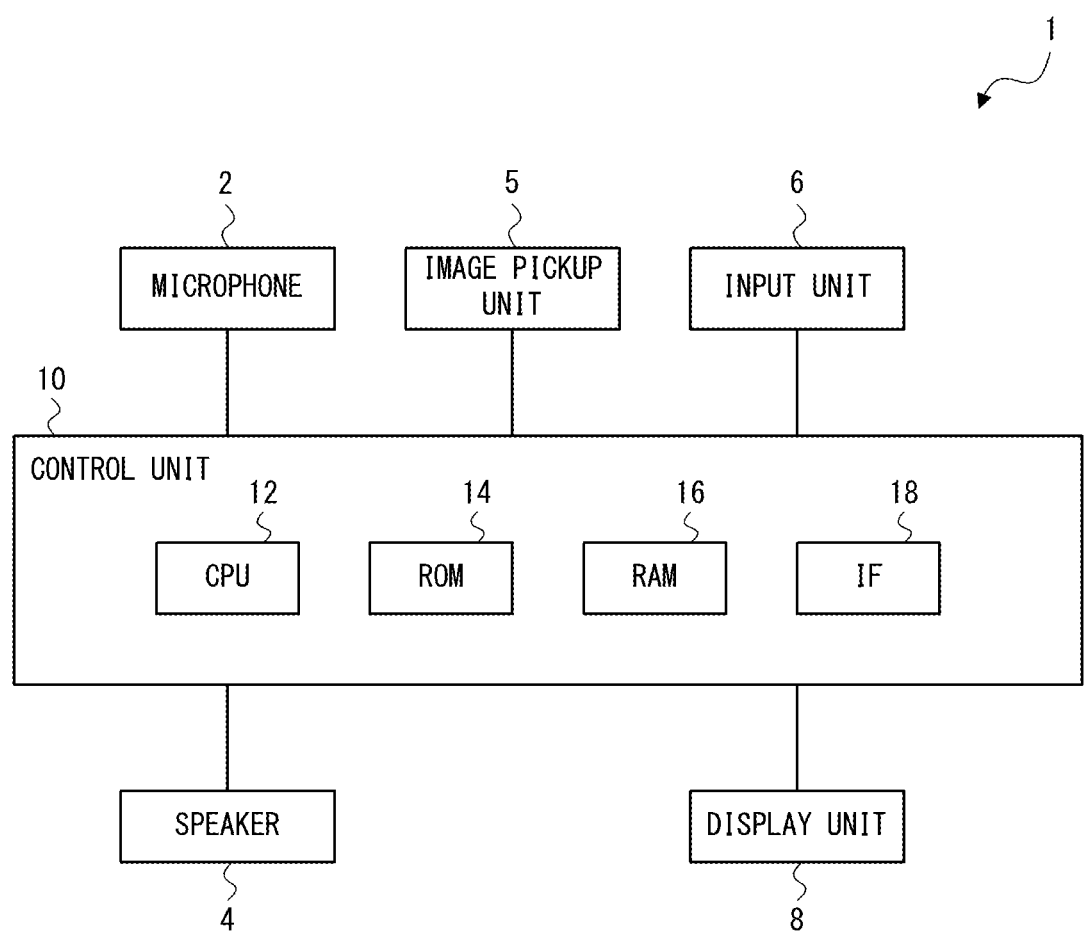
FIG. 1 shows a hardware configuration of an interaction system according to a first embodiment.

FIG. 1 shows a hardware configuration of an interaction system 1 according to a first embodiment. The interaction system 1 interacts with a user by using a voice or a character string (text). Note that in the following description, the "speech" is not limited to voices, but includes character strings. The interaction system 1 communicates with a user by making a speech (a system speech) to the user in response to a speech (a user speech) from the user. The interaction system 1 can be installed in, for example, a robot such as a life support robot and a small robot, a cloud system, and a user terminal such as a smartphone and a tablet-type terminal. In the first embodiment described hereinafter, an example in which the interaction system 1 is installed in a user terminal is mainly shown.

The interaction system 1 includes a microphone 2 that collects ambient sounds, a speaker 4 that output sounds, an image pickup unit 5 such as a camera, an input unit 6, a display unit 8, and a control unit 10. The main function of the microphone 2 is to collect speech sounds of a user. The microphone 2 converts the collected speech sounds of the user into a sound signal and outputs the sound signal as an input speech from the user (a user speech) to the control unit 10. The speaker 4 receives a sound signal converted in the control unit 10 and outputs the sound signal as an output speech (a system speech).

The input unit 6 and the display unit 8 are user interfaces. The input unit 6 is, for example, an input device such as a touch panel or a keyboard. Further, the display unit 8 is an output device such as a display. Note that the input unit 6 and the display unit 8 may be formed as a touch panel in which the input device is integrated with the output device. That is, the input unit 6 and the display unit 8 are not necessarily physically separate components. When an interaction is performed by using character strings, the input unit 6 may be used by the user to input a user speech in the form of a character string. Further, in such a case, the display unit 8 can be used so that the interaction system 1 displays a system speech therein in the form of a character string or the like. Further, the display unit 8 displays a character (e.g., a mascot character) that is created by the interaction system 1 under the control of the control unit 10. Its details will be described later.

The control unit 10 has, for example, functions of a computer. The control unit 10 is connected to the microphone 2, the speaker 4, the image pickup unit 5, the input unit 6, and the display unit 8 through a cable or wirelessly. When an interaction is performed through voices, the control unit 10 analyzes a user speech obtained through the microphone 2, determines a system speech for the user according to the user speech, and outputs the determined system speech to the speaker 4. Further, when an interaction is performed by using character strings, the control unit 10 analyzes a user speech in the form of a character string input by the input unit 6, and determines and outputs a system speech for the user according to the analyzed user speech. Note that the interaction is not limited to the cases where both the user speech and the system speech are voice speeches, or both the user speech and the system speech are speeches in the form of character strings. One of the user speech and the system speech may be a voice speech and the other of them may be a speech in the form of a character string.

The control unit 10 includes, as principal hardware components, a CPU (Central Processing Unit) 12, a ROM (Read Only Memory) 14, a RAM (Random Access Memory) 16, and an interface unit (IF; Interface) 18. The CPU 12, the ROM 14, the RAM 16, and the interface unit 18 are connected with each other through a data bus or the like.

The CPU 12 has functions as an arithmetic apparatus that performs control processes, arithmetic processes, etc. The ROM 14 has a function of storing a control program(s), an arithmetic program(s), etc. that are executed by the CPU 12. The RAM 16 has a function of temporarily storing processing data and the like. The interface unit 18 externally receives/outputs signals wirelessly or through a wire. Further, the interface unit 18 receives an operation for inputting data performed by a user and performs a process for displaying information for the user.

Figure 2:
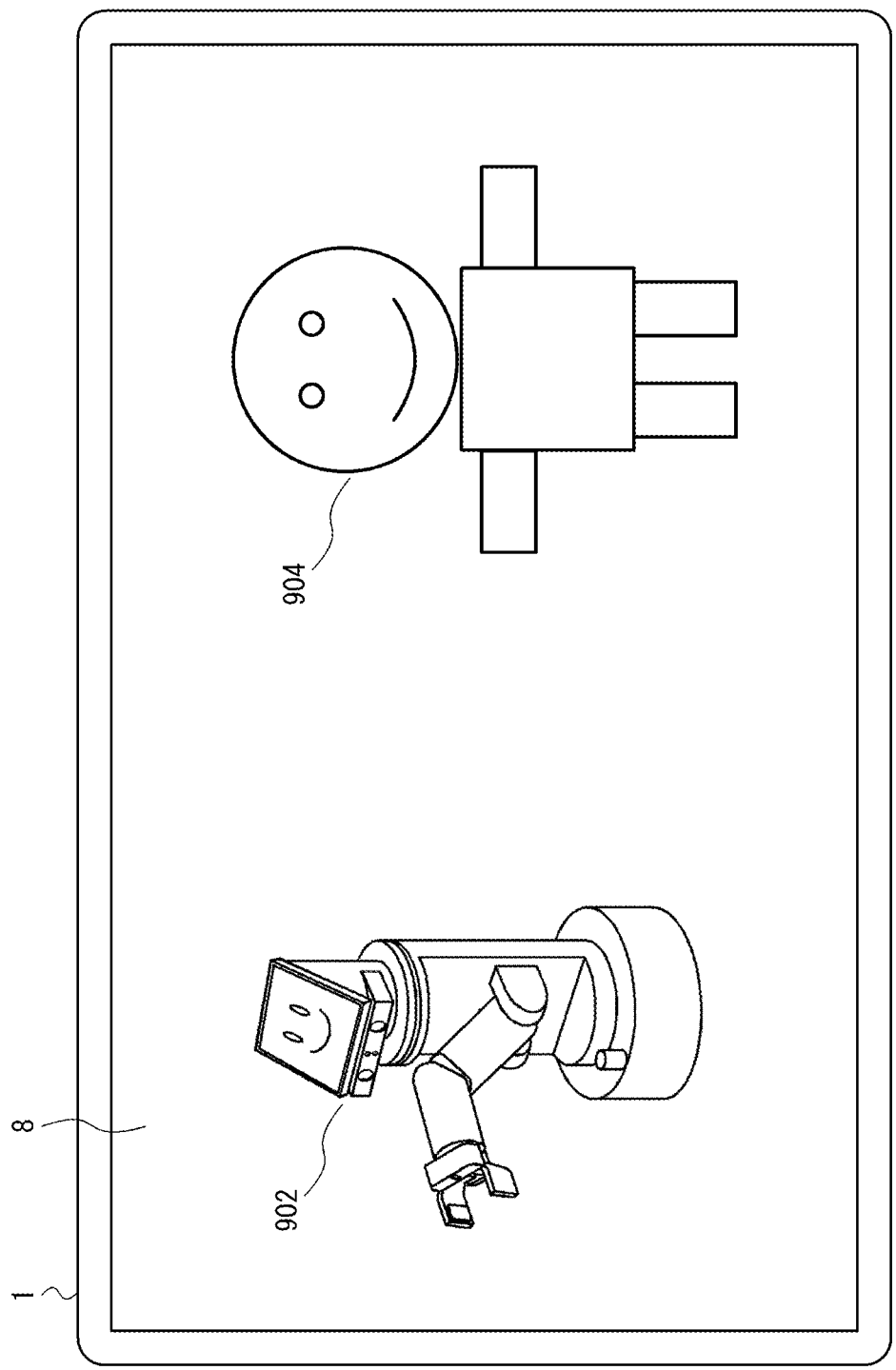
FIG. 2 shows an example of characters displayed by the interaction system according to the first embodiment.

FIG. 2 shows an example of characters (e.g., mascot characters) displayed by the interaction system 1 according to the first embodiment. The display unit 8 displays a growing character 902 and a supporting character 904. The interaction system 1 interacts with a user through these two characters (interaction models), i.e., the growing character 902 and the supporting character 904. That is, the user interacts with the growing character 902 and the supporting character 904. Note that the growing character 902 corresponds to a first interaction model (which will be described later) and the supporting character 904 corresponds to a second interaction model (which will also be described later). Note that in the example shown in FIG. 2, the growing character 902 and the supporting character 904 are virtually implemented (i.e., virtually materialized) in a user terminal. However, the supporting character 904 does not necessarily have to be displayed in the display unit 8 and may be implemented as, for example, a chatting function by which a speech is displayed in the form of text. Further, the supporting character 904 may be implemented as voices alone.

The growing character 902 is configured so that its communication function expressed to the user is improved from an initial state through communication with the user. That is, the growing character 902 may be configured so that it can hardly communicate with the user in the initial stage. Then, as the communication function of the growing character 902 is improved by performing communication with the user, such as an interaction with the user, the user feels as if the growing character 902 is growing.

The supporting character 904 is configured to interact with the user through a communication function better than the initial state of the growing character 902 and thereby to support the communication between the growing character 902 and the user. That is, unlike the growing character 902, the supporting character 904 can smoothly communicate with the user from the beginning. Further, in response to a speech by the user, the supporting character 904 may make a speech for the user to indicate an action that the user should perform in order to improve the communication function of the growing character 902. That is, the supporting character 904 interacts with the user by a communication function better than the initial state of the growing character 902, and thereby makes a speech for the user for supporting the improvement of the communication function of the growing character 902. Because of the presence of the supporting character 904, the user can understand what he/she should do to nurture (i.e., bring up) the growing character 902.

The interaction system 1 converts speeches of the growing character 902 and the supporting character 904 into sound signals and outputs the sound signals to the speaker 4. When doing so, in order to clarify which of the growing character 902 and the supporting character 904 is speaking, the interaction system 1 may change the tones of voices, such as the intonations and the frequencies of voices, of the growing character 902 and the supporting character 904 from each other.

Alternatively, the interaction system 1 may display speeches of the growing character 902 and the supporting character 904 in the form of character strings in balloon-type text boxes in the display unit 8. When doing so, in order to clarify which of the growing character 902 and the supporting character 904 is speaking, the interaction system 1 may display the text box near the character that has made the speech.

Figure 3:
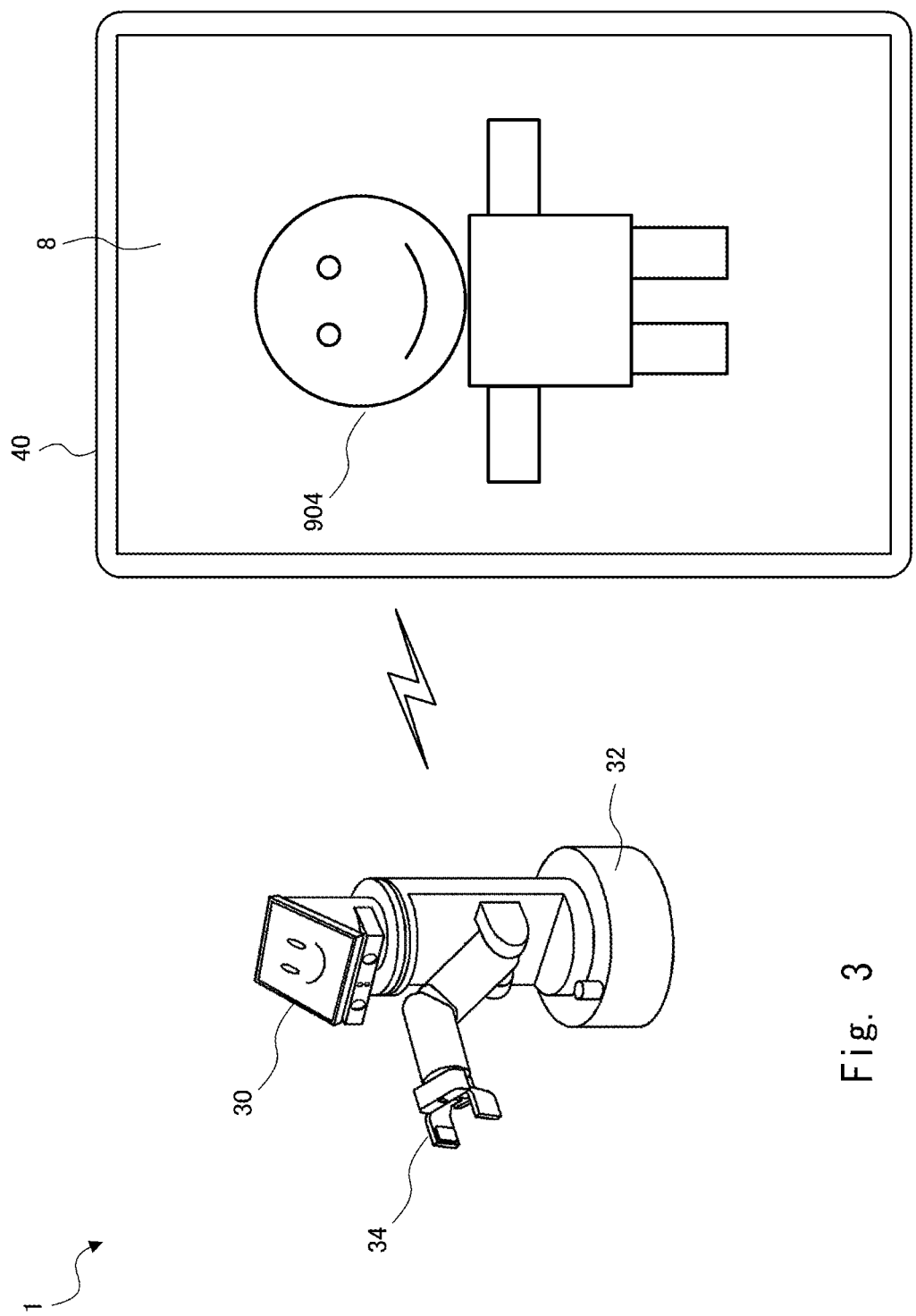
FIG. 3 shows an example in which the interaction system according to the first embodiment is installed in an actual communication robot and a user terminal.

FIG. 3 shows an example in which the interaction system 1 according to the first embodiment is installed in an actual communication robot and a user terminal. In this case, the interaction system 1 includes an actual communication robot 30 and a user terminal 40. The actual communication robot 30 is an actual entity that physically embodies the growing character 902 shown in FIG. 2. Further, the user terminal 40 implements (i.e., virtually materializes) the supporting character 904 shown in FIG. 2.

The actual communication robot 30 is a self-contained mobile robot such as a life support robot. The user terminal 40 is, for example, a smartphone or a tablet-type terminal. Each of the actual communication robot 30 and the user terminal 40 may have the hardware configuration shown in FIG. 1. Further, the actual communication robot 30 includes a movable base part 32 and a robot arm 34. The movable base part 32 has a function by which the actual communication robot 30 autonomously moves. The movable base part 32 may include wheels, motors, and the like. The robot arm 34 has a function of holding an object and handing over it to a user. The robot arm 34 may include a joint(s), an end effector (a robot hand), and the like. Further, the actual communication robot 30 and the user terminal 40 communicate with each other through a cable or wirelessly by using respective interface units 18.

Figure 4:
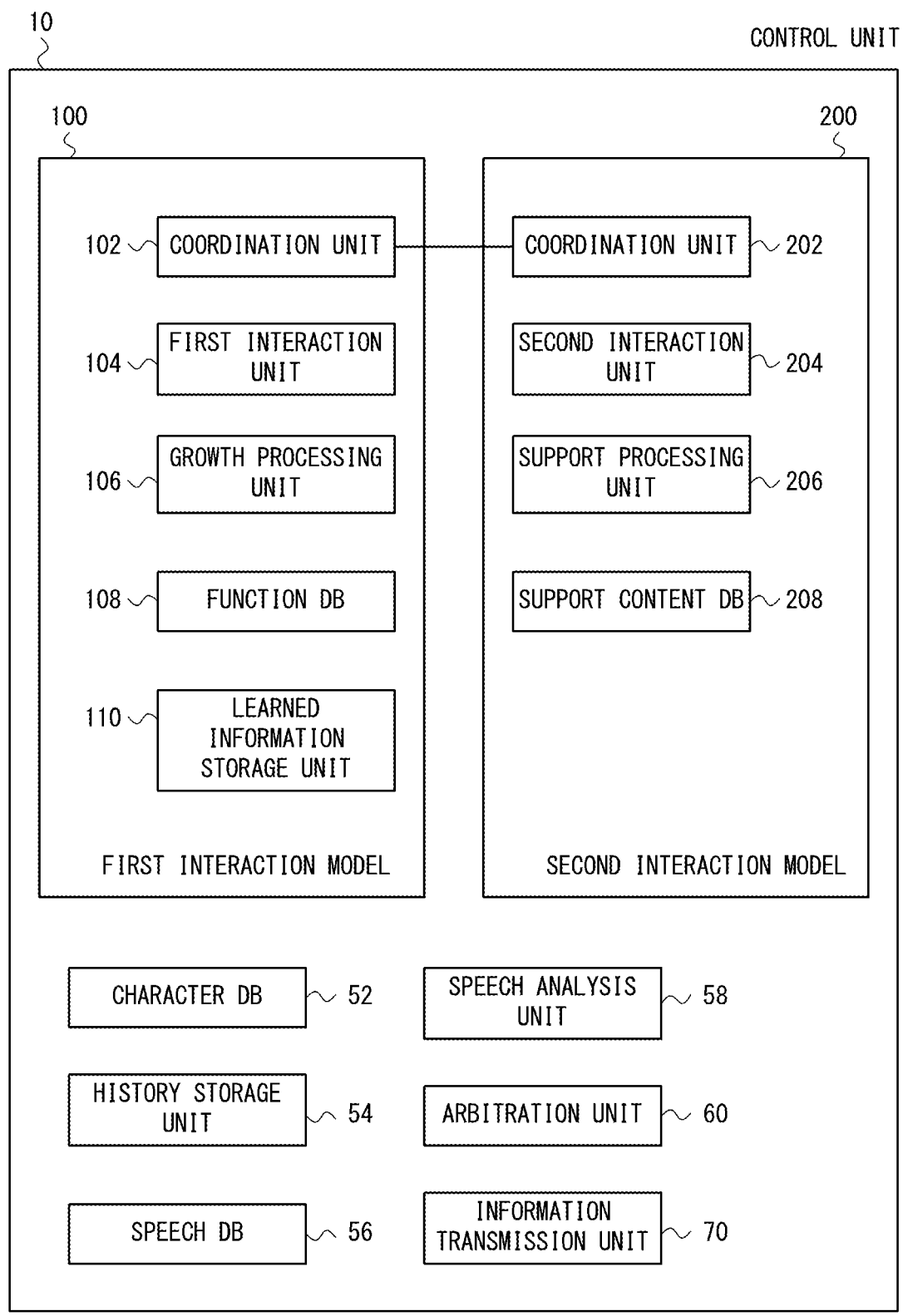
FIG. 4 is a functional block diagram showing a configuration of a control unit according to the first embodiment.

FIG. 4 is a functional block diagram showing a configuration of the control unit 10 according to the first embodiment. The control unit 10 includes a character database (a character DB) 52, a history storage unit 54, a speech database (a speech DB) 56, a speech analysis unit 58, an arbitration unit 60, and an information transmission unit 70. The control unit 10 further includes a first interaction model 100 and a second interaction model 200. The first interaction model 100 includes a coordination unit 102, a first interaction unit 104, a growth processing unit 106, a function database (a function DB) 108, and a learned information storage unit 110. The second interaction model 200 includes a coordination unit 202, a second interaction unit 204, a support processing unit 206, and a support content database (a support content DB) 208.

The first and second interaction models 100 and 200 interact with a user. The first interaction model 100 is configured to implement (i.e., virtually materialize) the growing character 902 shown in FIG. 2. The second interaction model 200 is configured to implement (i.e., virtually materialize) the supporting character 904 shown in FIG. 2. In other words, the growing character 902 is a virtual character for expressing the function of the first interaction model 100 to the user. Further, the supporting character 904 is a virtual character for expressing the function of the second interaction model 200 to the user. Therefore, the first interaction model 100 is configured so that a communication function expressed to the user is improved from an initial state through communication with the user. Further, the second interaction model 200 is configured to interact with the user by a communication function better than the initial state of the first interaction model 100 and thereby to support the communication between the first interaction model 100 and the user.

Each of the components shown in FIG. 4 can be implemented by, for example, having the CPU 12 execute a program(s) stored in the ROM 14. Further, necessary programs may be stored in an arbitrary nonvolatile recording medium in advance, and the CPU 12 may install them as required. Note that the implementation of each component is not limited to the above-described software implementation and may be implemented by hardware such as some type of circuit devices.

Note that when the interaction system 1 is implemented as shown in FIG. 3, the actual communication robot 30 may include the components shown in FIG. 4 except for the second interaction model 200. Further, the user terminal 40 may include the components shown in FIG. 4 except for the first interaction model 100. Further, the user terminal 40 may not include the information transmission unit 70. That is, the first interaction model 100 controls the functions of the actual communication robot 30, and the second interaction model 200 controls the functions for the supporting character 904 in the user terminal 40. In other words, the actual communication robot 30 is a physical apparatus for expressing the function of the first interaction model 100 to the user. Further, the user terminal 40 is a physical apparatus for expressing the function of the second interaction model 200 to the user.

The character database 52 stores information about each of the growing character 902 and the supporting character 904. For example, the character database 52 stores video data of each of the growing character 902 and the supporting character 904. Further, the character database 52 may store information about voices (voice information) of each of the growing character 902 and the supporting character 904. The history storage unit 54 stores reference data including information about interactions that have been performed between the user and the growing character 902 up to this point and information about interactions that have been performed between the user and the supporting character 904 up to this point.

The speech database 56 stores individual words that have been organized as a corpus together with their reproducible speech data. Note that the information stored in the speech database 56 does not necessarily have to be stored inside the interaction system 1. For example, the information may be acquired from an external server or the like through a network.

The speech analysis unit 58 analyzes a user speech acquired from the microphone 2 and converts it into text. By doing so, the speech analysis unit 58 recognizes the content of the user speech. Specifically, the speech analysis unit 58 recognizes the content of the user speech by using an ordinary voice recognition technique. For example, the speech analysis unit 58 performs a syntax analysis, a word analysis, or the like on the text of the input speech, and recognizes the content of the speech by using a DNN (Deep Neural Network) model or a logistic regression model.

The arbitration unit 60 determines whether the user is talking to the growing character 902 or to the supporting character 904 based on the user speech. When the arbitration unit 60 determines that the user is talking to the growing character 902, it performs a process for handing over the right to speak to the first interaction unit 104. On the other hand, when the arbitration unit 60 determines that the user is talking to the supporting character 904, it performs a process for handing over the right to speak to the second interaction unit 204. For example, when it is determined, based on the analysis result of the speech analysis unit 58, that the user speech indicates that the user is asking what he/she should do, the arbitration unit 60 may determine that the user is talking to the supporting character 904. Further, in the case where the learning by the learning function of the growing character 902 has not been properly advanced and hence the number of words that the growing character 902 can speak is smaller than a predetermined number, when the user talks to the growing character 902, the arbitration unit 60 may perform a process for handing over the right to speak to the second interaction unit 204.

The information transmission unit 70 performs a process for transmitting information (first information) about the first interaction model 100 (the growing character 902) to an external device by controlling the interface unit 18. The process performed by the information transmission unit 70 will be described later.

The coordination unit 102 of the first interaction model 100 and the coordination unit 202 of the second interaction model 200 are connected to each other so that they can communicate with each other, and they exchange information with each other. In this way, the second interaction model 200 cooperates with the first interaction model 100. The coordination unit 102 transmits first information to the coordination unit 202. That is, the coordination unit 202 functions as an information acquisition unit that acquires the first information from the coordination unit 102. In this way, the second interaction model 200 can recognize the state of the first interaction model 100 (the growing character 902). In particular, the coordination unit 202 acquires information stored in the function database 108 and the learned information storage unit 110 of the first interaction model 100. Note that the coordination unit 202 may transmit information (second information) about the second interaction model 200 (the supporting character 904) to the coordination unit 102, and the coordination unit 102 may acquire the second information from the coordination unit 202. Note that when the interaction system 1 is implemented as shown in FIG. 3, the coordination unit 102 may transmit the first information to the user terminal 40 through a cable or wirelessly by using the interface unit 18 of the actual communication robot 30 including the first interaction model 100.

The first interaction unit 104 is in charge of the speech function of the growing character 902. Specifically, the first interaction unit 104 refers to the character database 52 and displays the growing character 902 in the display unit 8. Further, the first interaction unit 104 refers to the speech database 56 and generates a response speech sentence suitable for a user speech. Then, the first interaction unit 104 outputs the response speech sentence in the form of voices from the speaker 4 or displays it in the form of text in the display unit 8. In this process, the first interaction unit 104 refers to the function database 108 and the learned information storage unit 110 (which will be described later) and thereby implements an executable communication function at an executable level. Therefore, in the initial state in which the communication function has not been improved yet, the first interaction unit 104 may make a speech at such a low level that the user cannot fully understand the content of the speech. Further, the first interaction unit 104 controls the image pickup unit 5 and acquires a face image of the user interacting with the interaction system.

The growth processing unit 106 refers to the function database 108 (which will be described later) and performs a process for improving the communication function expressed to the user. Specifically, the growth processing unit 106 communicates with the user by, for example, executing a mini-game program. Then, when the user clears (i.e., finishes) the mini game, the growth processing unit 106 releases a function that corresponds to the mini game and has been provided in the first interaction model 100 in advance and makes the released function executable. As a result, the first interaction unit 104 can perform that function. A function that is provided in the first interaction model 100 in advance but cannot be performed in the initial state, and then becomes executable when it is released as described above is referred to as a "released function", Note that the mini game will be described later.

Further, the growth processing unit 106 learns information about the user, words, and the like through communication with the user, such as interactions with the user. Consequently, the first interaction unit 104 communicates with the user by using the information that has been obtained and accumulated through the learning. A function whose performance is improved as data is accumulated as described above is referred to as a "learned function". Note that since the learned function is gradually improved every time the user communicates with the first interaction model 100 (the growing character 902), it may be performed by the growth processing unit 106. In contrast, since the released function does not need to be gradually improved once it is released, the released function may be implemented by the first interaction unit 104 after it is released.

The function database 108 stores information (function information) about functions that may be performed by the first interaction model 100 at the present time or in the future. The learned information storage unit 110 stores learned information about data accumulated by the learned function. These information items will be described below.

FIG. 5 shows an example of function information stored in the function database 108 according to the first embodiment. The function database 108 stores the above-described released function and the learned function, and current execution levels of these functions. The released function includes, for example, a robot operation function, a weather forecast function, a transfer guide function, and an emotion expression function. Further, the learned function includes, for example, a user learning function, a word learning function, and a space recognition function. Note that when the first interaction model 100, i.e., the growing character 902 is virtually implemented by the user terminal as shown in FIG. 2, the space recognition function may be unnecessary. Note that since these functions are expressed to the user, they can be regarded as communication functions.

The robot operation function is a function for operating the robot corresponding to the first interaction model 100 (i.e., the growing character 902 or the actual communication robot 30). When the first interaction model 100 corresponds to the virtual growing character 902, the robot operation function may operate (i.e., implement) the growing character 902 as animation displayed in the display unit 8. Further, when the first interaction model 100 corresponds to the actual communication robot 30, the robot operation function may control the movable base part 32 and thereby make the actual communication robot 30 autonomously move, or may operate the robot arm 34.

The weather forecast function is a function of providing a weather forecast to a user in response to a user speech (e.g., "Tell me the weather tomorrow") or in an autonomous manner. The weather forecast function may obtain a weather forecast, for example, through the Internet. The weather forecast function may output the weather forecast in the form of voices by controlling the speaker 4, or may visually display the weather forecast by controlling the display unit 8.

The transfer guide function is a function of providing a traffic guide to a destination in response to a user speech (e.g., "Tell me how to get to the stadium") or in an autonomous manner. The transfer guide function may acquire transfer guide, for example, through the Internet. The transfer guide function may output the transfer guide in the form of voices by controlling the speaker 4, or may visually display the transfer guide by controlling the display unit 8.

The emotion expression function is a function of expressing an emotion of the growing character 902 corresponding to the first interaction model 100 in the form of voices or video images. For example, the emotion expression function may express a joy in the form of voices by controlling the speaker 4, or may display a smile by controlling the display unit 8.

The user learning function is a function of learning characteristics (a face image, a name, etc.) of the user through communication with the user and communicating with the user based on the learned contents. The user learning function stores information indicating the learned contents about the user in the learned information storage unit 110 (which will be described later). When the user learning function has learned, for example, a name and a face image of a given user while associating them with each other, it may recognize the face of that user by controlling the image pickup unit 5 and output the name of the user in the form of voices. Further, for example, the user learning function may change the degree of intimacy in interactions according to the number of contacts (which will be described later). For example, the user learning function may control the first interaction unit 104 so that it interacts with a user of which the number of contacts is less than N (N is a predetermined integer no less than two; e.g., five times) by using polite expressions, and interacts with a user of which the number of contacts is equal to or greater than N without using polite expressions.

Further, for example, when the user learning function has become to be able to identify a user by face recognition or the like, it may learn a time zone during which the interaction system often interacts with that user and then control the first interaction unit 104 so that the interaction system talk to that user during that time zone. In this case, the user learning function may control the first interaction unit 104 so that the interaction system says "What happened?" or the like to the user when the user has behaved differently from the ordinary conversation timing (such as when the user has not talked at the aforementioned time zone).

The word learning function is a function of accumulating user speeches and using the accumulated user speeches for system speeches. The word learning function retains results of voice recognition of the user and stores, among the retained results, words such as nouns into the learned information storage unit 110 (which will be described later). The word learning function asks the user the meaning of a word (such as a name of a person, a name of a place, a food, and a greeting) at an arbitrary timing, and associates the meaning with the word. Further, the word learning function controls the first interaction unit 104 so as to incorporate the stored word into a conversation held later. For example, when the user says "Toyota", the first interaction model 100 (the growing character 902) says "What is Toyota?". Then, when the user answers "a name of a place", the first interaction model 100 says "I went to Toyota the other day" or the like in an interaction held at a later date.

The space recognition function is a function of recognizing the shape of a room and generates a map for each room. The space recognition function makes the first interaction model 100 (the actual communication robot 30) autonomously move inside a room by controlling the movable base part 32 and the image pickup unit 5 thereof, searches the room while acquiring the shape of the room by using the image pickup unit 5 (such as a camera or a three-dimensional sensor), generates a map of the room, and stores the generated map in the learned information storage unit 110 (which will be described later). In this process, the space recognition function may perform a map generation process when it finds a room of which no map data is stored. Further, in a room of which map data is stored, the space recognition function may operate according to the map and update the stored map for a part(s) that is different from that in the stored map.

Further, the execution level indicates to what extent the corresponding function can be executed. The execution level of the released function may be either "executable" or "non-executable". Further, the execution level of the learned function may be determined according to, for example, an amount of accumulated learned information (which will be described later). That is, the smaller the amount of the accumulated learned information about the corresponding function is, the lower the execution level of the learned function may become. Conversely, the larger the amount of the accumulated learned information is, the higher the execution level of the learned function may become.

In the example shown in FIG. 5, while the robot operation function is executable (i.e., the function is released), the weather forecast function, the transfer guide function, and the emotion expression function are not executable (i.e., the functions are not released). Further, the execution level of the user learning function is "low" and the execution levels of the word learning function and the space recognition function are "intermediate".

FIG. 6 shows an example of learned information stored in the learned information storage unit 110 according to the first embodiment. The learned information may include user information, word information, and space information. The user information is learned information accumulated by the user learning function. The word information is learned information accumulated by the word learning function. The word information may be a word dictionary. The space information is learned information accumulated by the space recognition function.

The user information includes, for example, a face image of a user, a name of the user, the number of contacts the user and the first interaction model 100 (the growing character 902) have contacted (interacted), and an interaction timing (s) that is the timing of the interaction with the user. Note that the interaction timing may be a time zone during which the first interaction model 100 interacts with the user most frequently. Further, regarding the face image, each time the first interaction model 100 interacts with the corresponding user, the face image of that user is acquired. Since the face image of the user is accumulated every time the first interaction model 100 interacts with the user as described above, the recognition accuracy of the user is improved.

In the example shown in FIG. 6, a user name "Mr./Ms. X", the number of contacts "six times", and an interaction timing "7 p.m. on weekdays" are associated with a face image X. Further, a user name "Mr./Ms. Y" and the number of contacts "twice" are associated with a face image Y. Note that no interaction timing is stored for the face image Y (Mr./Ms. Y) because the number of contacts is small. Further, only the number of contacts "once" is associated with a face image Z because the first interaction model 100 could not acquire the name of the corresponding user. In the example shown in FIG. 6, the first interaction model 100 may interact with the user "Mr./Ms. X" without using polite expressions, and/or may interact with the user "Mr./Ms. X" at 7 p.m. on a weekday.

The word information includes words (nouns etc.) and their meanings. In the example shown in FIG. 6, a meaning "food" is associated with a word "apple" and a meaning "name of place" is associated with a word "Toyota". Further, a meaning "greeting in morning" is associated with a word "Good morning". In the example shown in FIG. 6, the first interaction model 100 may say "Do you like apple?" to a given user. Further, the first interaction model 100 may also say "Good morning" to a given user in the morning.

The space information includes identification information of rooms and map information representing maps of the rooms. Note that the map information is information indicating three-dimensional coordinate data (or two-dimensional coordinate data) of each position (a point cloud) of each object present in each room. The map information may indicate, for example, whether or not there is any object at a point indicated by a certain three-dimensional coordinates (X, Y, Z).

Regarding the second interaction model 200 (FIG. 4), the second interaction unit 204 is in charge of the speech function of the supporting character 904. Specifically, the second interaction unit 204 refers to the character database 52 and displays the supporting character 904 in the display unit 8. Further, the second interaction unit 204 refers to the speech database 56 and generates a response speech sentence suitable for a user speech. Then, the second interaction unit 204 outputs the response speech sentence in the form of voices from the speaker 4 or displays it in the form of text in the display unit 8. Note that the second interaction unit 204 has a communication function better than the initial state of the first interaction model 100 (the first interaction unit 104). Therefore, the second interaction model 200 can make a speech at such a high level that a user can fully understand the content of the speech from the initial state.

The support processing unit 206 refers to the support content database 208 and makes a speech for supporting the above-described improvement of the communication function of the first interaction model 100. In this process, the support processing unit 206 acquires the state of the first interaction model 100 acquired by the coordination unit 202 (such as the function information and the learned information) and provides a support according to the acquired state. Its details will be described later.

The support content database 208 stores, for each of the communication functions of the first interaction model 100 described with reference to FIG. 5, a content of a speech for supporting the improvement of that function and a criterion for determining the timing of the speech. The support processing unit 206 refers to the support content database 208 and makes a speech for the user for supporting the improvement of the communication function of the first interaction model 100 at a timing at which the support should be provided. Its details will be described later.

Figure 7:
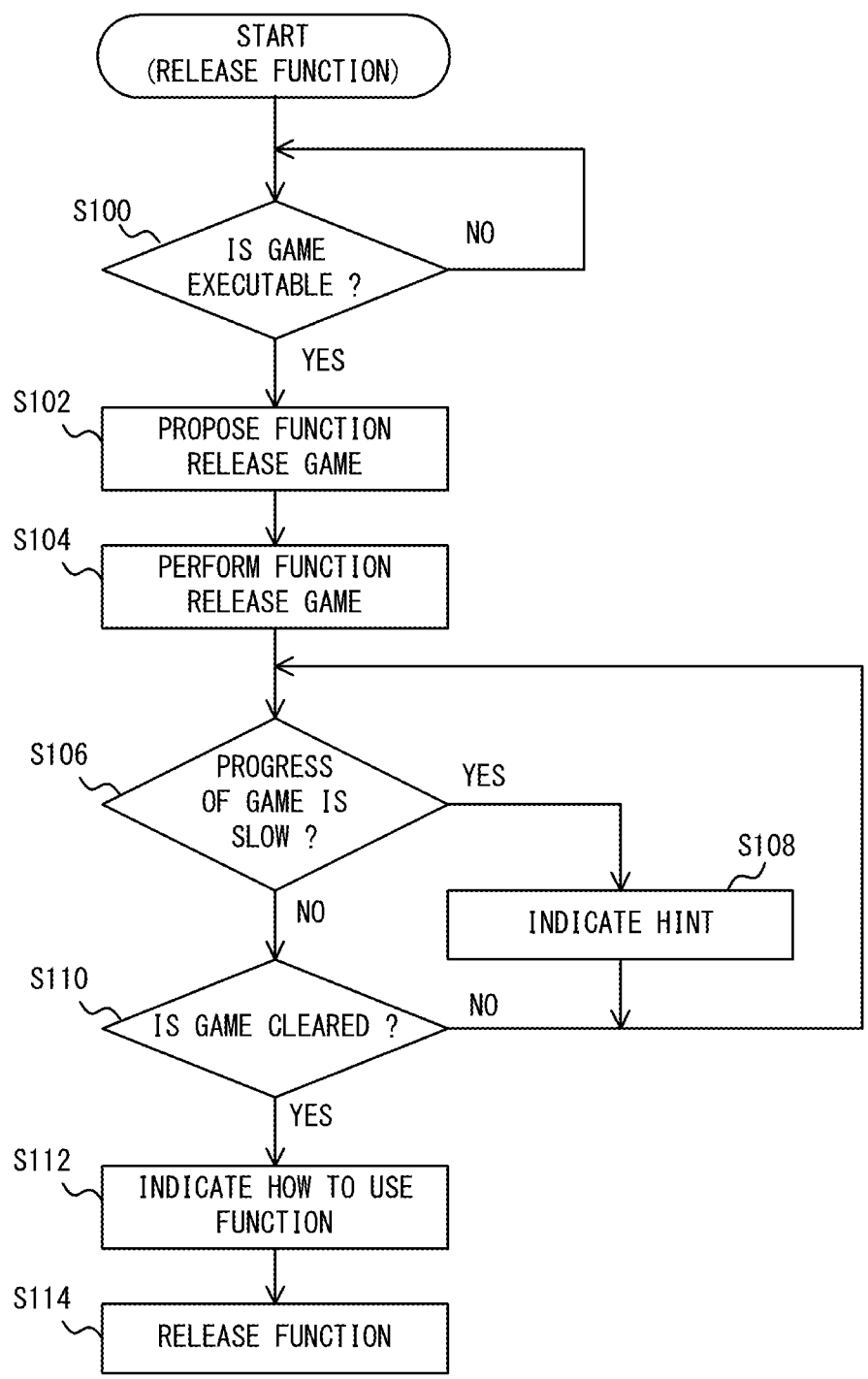
FIG. 7 is a flowchart showing an interaction method performed by an interaction system.
Figure 8:
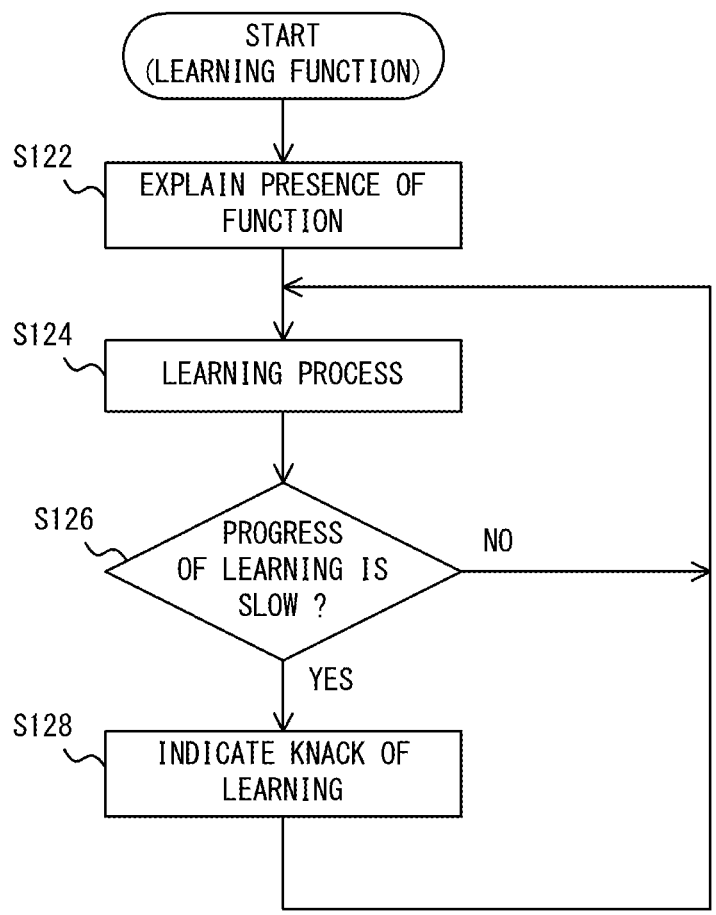
FIG. 8 is a flowchart showing an interaction method performed by an interaction system.

Next, operations performed by the interaction system 1 will be described with reference to FIGS. 7 and 8. FIGS. 7 and 8 are flowcharts showing interaction methods performed by the interaction system 1. FIG. 7 shows a method for improving the released function of the first interaction model 100 (the growing character 902) (i.e., a method for making the released function executable).

Firstly, the support processing unit 206 refers to first information acquired by the coordination unit 202 and determines whether or not the first interaction model 100 is in a state in which it can perform a function release game (a mini game) for releasing a certain released function A (step S100). When the first interaction model 100 is in the state in which it can perform the function release game (Yes at S100), the support processing unit 206 performs a process for outputting a speech for proposing the function release game to the user (step S102). After that, the growth processing unit 106 performs the function release game for the released function A (step S104). In this process, the support processing unit 206 or the growth processing unit 106 outputs a speech for explaining the function release game. Note that while the growth processing unit 106 is performing the function release game, the coordination unit 202 continues acquiring the first information of the first interaction model 100 and the support processing unit 206 monitors the progress of the function release game in the first interaction model 100 based on the acquired first information.

The support processing unit 206 determines whether or not the progress of the function release game is slow (step S106). For example, the support processing unit 206 calculates an elapsed time from the start of the game by using the game progress information, which is the first information indicating the progress of the game, acquired from the first interaction model 100. Then, when the elapsed time has exceeded a predetermined certain time, the support processing unit 206 may determine that the progress of the function release game is stagnating (e.g., is slow). Alternatively, when the first interaction model 100 or the second interaction model 200 receives a user speech ("How do I play the game?" or the like) indicating that the user does not know how to advance the game, the support processing unit 206 may determine that the progress of the function release game is stagnating.

When it is determined that the progress of the function release game is stagnating (Yes at S106), the support processing unit 206 shows a hint for advancing the function release game through a speech (step S108). When it is determined that the improvement of the communication function is stagnating as described above, the support processing unit 206 provides a support.

On the other hand, when it is determined that the progress of the function release game is not stagnating (No at S106), the support processing unit 206 determines whether or not the game is cleared (i.e., finished) based on the game progress information acquired from the first interaction model 100 (step S110). When the game has not been cleared yet (No at S110), the process returns to the step S106. On the other hand, when the game has been cleared (Yes at S110), the support processing unit 206 outputs a speech for indicating how to use the released function A to the user (step S112). Further, the growth processing unit 106 releases the released function A and makes it executable (step S114).

For example, in the case where the robot operation function is made executable, the support processing unit 206 may determine that a game for releasing the robot operation function is executable when, for example, a state in which the growing character 902 is disassembled into components is displayed (S100). Further, the function release game of the robot operation function may be a game in which a user searches for components of the growing character 902 in a virtual space displayed in the display unit 8 (S102 and S104). Then, when it is determined that the progress of the game is stagnating, the support processing unit 206 may output a speech (such as "The arm of the robot seems to be in XX") indicating a place of a component that has not been found yet in the virtual space (S108). Then, when the user has found all the components of the growing character 902, the support processing unit 206 may determine that the game has been cleared (i.e., finished) (S110).

Note that when the growing character 902 is implemented by the actual communication robot 30 as shown in FIG. 3, the release of the robot operation function is not limited to the method in which the user plays a game in a virtual space. The robot operation function may be released when the user manually assembles the actual communication robot 30 from a state in which the actual communication robot 30 is actually disassembled.

Further, in the case where the weather forecast function is made executable, the support processing unit 206 may determine that a game for releasing the weather forecast function is executable when, for example, the robot operation function is executable (S100). Alternatively, the support processing unit 206 may determine that a game for releasing the weather forecast function is executable when, for example, the amount of accumulated word information is equal to or greater than a predetermined threshold (S100). Further, the function release game of the weather forecast function may be, for example, a connecting game in which a user connects an icon representing weather (e.g., in the case of "fine weather", a picture of the sun) with a character string indicating that weather in a virtual space displayed in the display unit 8 (S102 and S104). Then, when the user has correctly connected all the icons representing weather with the respective character strings indicating weather, the support processing unit 206 may determine that the game has been cleared (S110).

Further, in the case where the transfer guide function is made executable, the support processing unit 206 may determine that a game for releasing the transfer guide function is executable when, for example, the robot operation function is executable (S100). Alternatively, the support processing unit 206 may determine that a game for releasing the transfer guide function is executable when, for example, the amount of accumulated word information is equal to or greater than a predetermined threshold (S100). Further, the function release game of the transfer guide function may be, for example, a connecting game in which a user connects two identical icons (e.g., pictures of "buses") indicating vehicles with each other in a virtual space displayed in the display unit 8 (S102 and S104). Then, when the user has correctly connected the two icons for each type of vehicles with each other, the support processing unit 206 may determine that the game has been cleared (S110).

Further, in the case where the emotion expression function is made executable, the support processing unit 206 may determine that a game for releasing the emotion expression function is executable when, for example, the robot operation function is executable (S100). Alternatively, the support processing unit 206 may determine that a game for releasing the emotion expression function is executable when, for example, the amount of accumulated word information is equal to or greater than a predetermined threshold (S100). Further, the function release game of the emotion expression function may be, for example, a connecting game in which a user connects an icon representing an emotion (e.g., in the case of a "joy", a picture of a smile) with a character string indicating that emotion in a virtual space displayed in the display unit 8 (S102 and S104). Then, when the user has correctly connected all the icons representing emotions with the respective character strings indicating emotions, the support processing unit 206 may determine that the game has been cleared (S110).

FIG. 8 shows a method for improving the learned function of the first interaction model 100 (the growing character 902). Firstly, the support processor 206 makes a speech for explaining the presence of the learned function to the user (step S122). Then, the growth processing unit 106 performs the above-described learning function (step S124). Note that while the growth processing unit 106 is performing the learned function, the coordination unit 202 continues acquiring the first information of the first interaction model 100 and the support processing unit 206 monitors the progress of the learning in the first interaction model 100 based on the acquired first information.

The support processing unit 206 determines whether or not the progress of the learning is stagnating (step S126). For example, when a predetermined time has elapsed from the start of the learning but the amount of accumulated learned information has not exceeded a predetermined threshold yet, the support processing unit 206 may determine that the progress of the learning is stagnating. Alternatively, when a face is not appropriately recognized in the first interaction model 100, the support processing unit 206 may determine that the progress of the learning is stagnating. Alternatively, when the first interaction model 100 or the second interaction model 200 receives a user speech (such as "It seems that the learning by the robot has not been advanced") indicating that the learning has not been advanced, the support processing unit 206 may determine that the progress of the learning is stagnating.

When it is determined that the progress of the learning is stagnating (Yes at S126), the support processing unit 206 shows a knack for smoothly advancing the learning through a speech (step S128). When it is determined that the improvement of the communication function is stagnating as described above, the support processing unit 206 provides a support. On the other hand, when it is determined that the progress of the learning is not stagnating (No at S126), the support processing unit 206 does not show the knack for smoothly advancing the learning in order to prevent the user from being bothered. Further, the processes in the steps S124 to S128 are repeated.

For example, in the case where the user learning function is performed, when, for example, the support processing unit 206 determines that a face has not been recognized even though a user is present in front of the image pickup unit 5, it may determine that the progress of the learning is stagnating (Yes at S126). In this case, the support processing unit 206 may output a speech (such as "Please take off your hat") for explaining a knack for face recognition (S128). Further, when the number of users registered in the user information is smaller than a predetermined threshold, the support processing unit 206 may determine that the progress of the learning is stagnating (Yes at S126). In this case, the support processing unit 206 may make a speech for encouraging a user who is not registered in the user information to actively talk to the first interaction model 100 (the growing character 902) (S128). Further, when there is a user who is registered in the user information but of whom the number of contacts is smaller than a predetermined threshold, the support processing unit 206 may determine that the progress of the learning is stagnating (Yes at S126). In this case, the support processing unit 206 may make a speech for encouraging the user (e.g., Mr./Ms. Y) to actively talk to the first interaction model 100 (the growing character 902) (S128).

Further, in the case where the word learning function is performed, when, for example, the number of words registered in the word information is smaller than a predetermined threshold, the support processing unit 206 may determine that the progress of the learning is stagnating (Yes at S126). In this case, the support processing unit 206 may make a speech for encouraging a given user to actively talk to the first interaction model 100 (the growing character 902) and thereby teach the first interaction model 100 language (S128).

Further, in the case where the space recognition function is performed, when, for example, the amount of data accumulated in the space information is smaller than a predetermined threshold, the support processing unit 206 may determine that the progress of the learning is stagnating (Yes at S126). In this case, the support processing unit 206 may make a speech, to a given user, to the effect that the user should not interfere with the movement of the first interaction model 100 (the actual communication robot 30) (S128).

As described above, in the interaction system 1 according to the first embodiment, the first interaction model 100 is configured so that the communication function expressed to the user is improved from the initial state through communication with the user. Further, the second interaction model 200 is configured to interact with the user by a communication function better than the initial state of the first interaction model 100, and thereby make a speech for the user for supporting the improvement of the communication function of the first interaction model 100.

By configuring the first interaction model 100 as described above, the user may have such an experience that he/she nurtures the first interaction model 100 through some degree of hardships. Through this experience, the user may feel that he/she has nurtured the first interaction model 100 (the growing character 902) with tender care. As a result, the user may form an attachment to the first interaction model 100 (the growing character 902).

Further, since the second interaction model 200 is configured as described above, even in a state where the communication function of the first interaction model 100 is poor, it is still possible to prevent the user from not knowing what to do or becoming bored when the user nurtures the first interaction model 100 (the growing character 902). Therefore, since the user can acquire an experience of smoothly nurturing the first interaction model 100, the user can smoothly form an attachment to the first interaction model 100 (the growing character 902).

That is, the user can nurture the first interaction model 100 by receiving a support from the second interaction model 200, and hence can nurture the first interaction model 100 without depending on the state of the first interaction model 100. Therefore, the user can reliably experience as if the first interaction model 100 grows through the communication with the user. In this way, the user can form an attachment to the first interaction model 100.

Further, as described above, the second interaction model 200 according to the first embodiment is configured to acquire the state of the first interaction model 100 and provide a support according to the acquired state. In this way, the second interaction model 200 can provide a more appropriate support. Therefore, the user can nurture the first interaction model 100 more reliably. Further, as described above, the second interaction model 200 according to the first embodiment is configured to provide a support when it is determined that the improvement of the communication function of the first interaction model 100 is stagnating. Therefore, the second interaction model 200 can provide a support at an appropriate timing. Therefore, the user can nurture the first interaction model 100 more reliably.

Further, as described above, the second interaction model 200 according to the first embodiment is configured to make a speech for the user for indicating an action that the user should perform to improve the communication function of the first interaction model 100. As a result, the user can easily understand what he/she should do to nurture the first interaction model 100.

Further, unlike the first interaction model 100, the second interaction model 200 according to the first embodiment does not need to improve its communication function. That is, the degree of the improvement of the communication function of the second interaction model 200 according to the first embodiment is smaller than that of the first interaction model 100. If the second interaction model 200 is configured so as to grow, the user may form an attachment to the second interaction model 200. Therefore, by making the degree of the improvement of the communication function of the second interaction model 200 smaller than that of the first interaction model 100 (or making it not improve at all) as described above, it is possible to prevent the user from forming an attachment to the second interaction model 200. Therefore, it is possible for the user to reliably form an attachment to the first interaction model 100.

Figure 9:
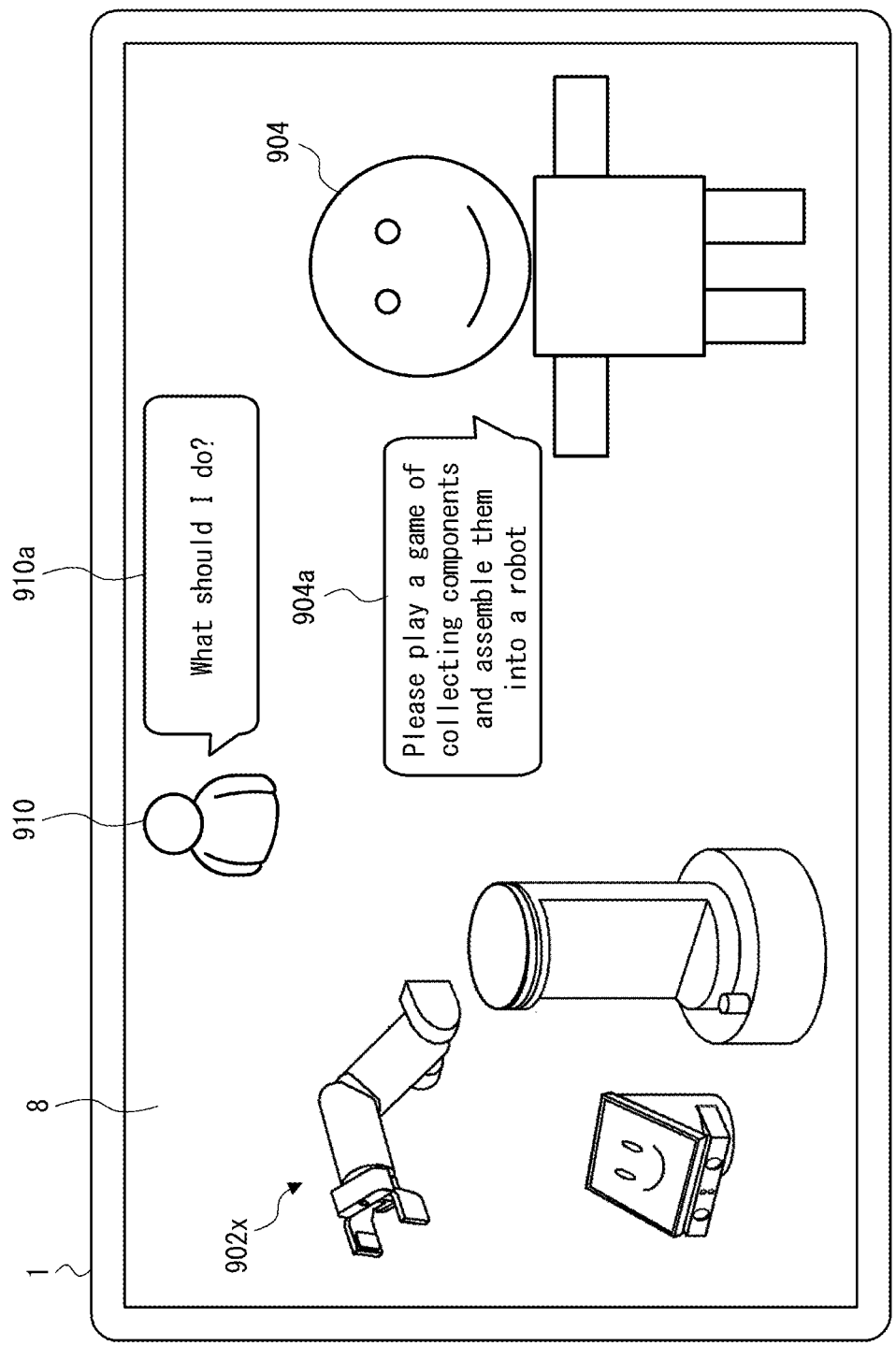
FIG. 9 shows an example of an interaction between a support character according to the first embodiment and a user.

FIG. 9 shows an example of an interaction between the support character 904 according to the first embodiment and a user. In the example shown in FIG. 9, a growing character 902x, which is disassembled into components, is displayed in the display unit 8. Further, the display unit 8 displays a user speech "What should I do?" in a balloon 910a near a user icon 910. In response to this speech, the display unit 8 displays a system speech "Please play a game of collecting components and assemble them into a robot" in a balloon 904a near the supporting character 904. In this case, the user may input a user speech by operating the input unit 6.

As described above, the second interaction model 200 according to the first embodiment is configured to make a speech for the user for indicating an action that the user should perform by using a character string. In this way, the second interaction model 200 can interact with the user more reliably. Therefore, it is possible to have the second interaction model 200 perform smooth communication with the user can.

Figure 10:
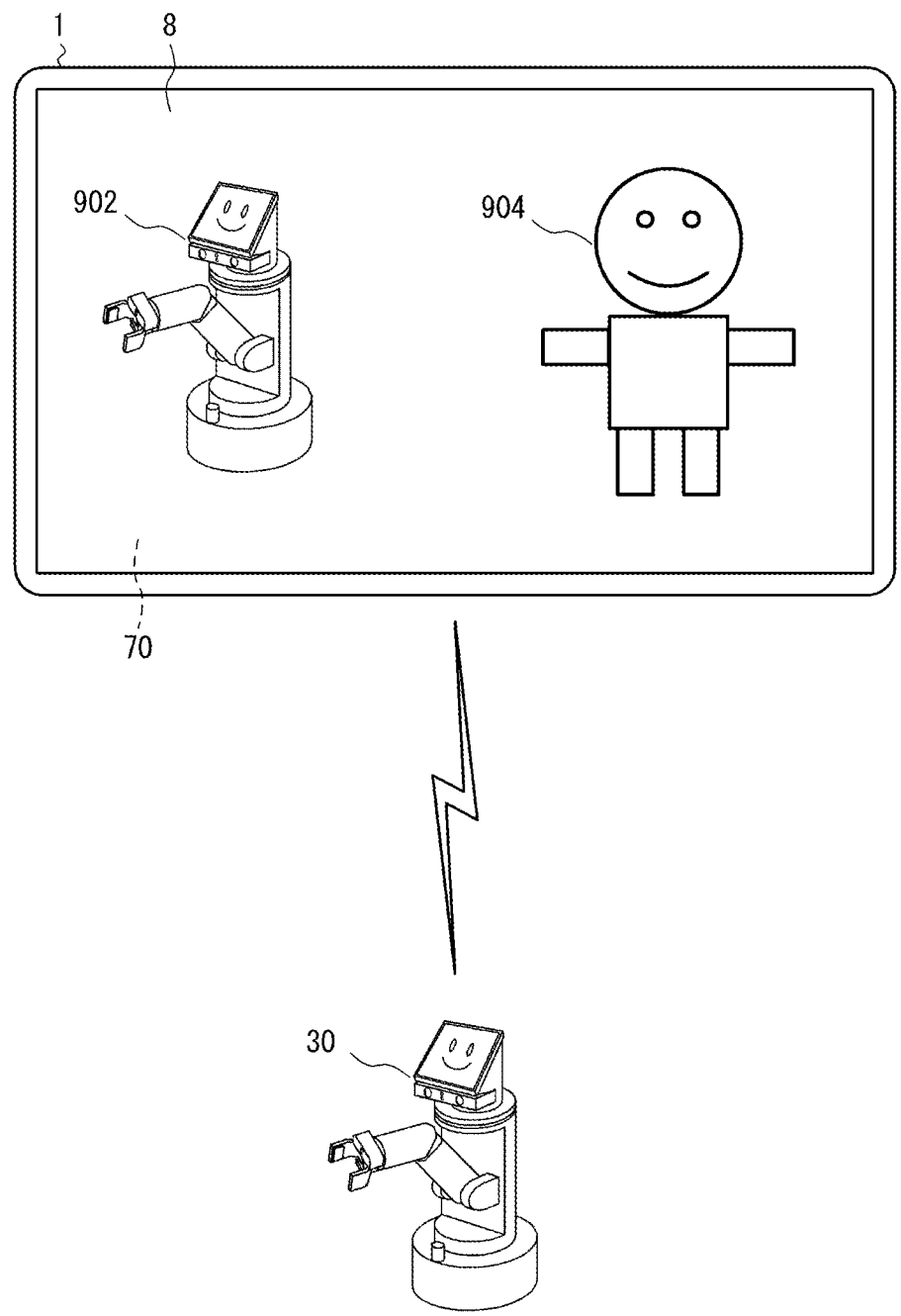
FIG. 10 is a diagram for explaining a process performed by an information transmission unit according to the first embodiment.

FIG. 10 is a diagram for explaining a process performed by the information transmission unit 70 according to the first embodiment. In this example, it is assumed that the interaction system 1 is implemented as shown in FIG. 2. As described above, the communication function of the first interaction model 100 can be improved by a support from the second interaction model 200. In this case, first information about the improved communication function is accumulated in the function database 108 and the learned information storage unit 110 of the first interaction model 100. The information transmission unit 70 transmits this first information to the actual communication robot 30 through a cable, wirelessly, or through a network. As a result, the actual communication robot 30 has the same communication function as that of the growing character 902 that has grown.

Therefore, for example, when the transfer guide function has already been released for the growing character 902, the actual communication robot 30 can provides a transfer guide. Meanwhile, when the weather forecast function has not been released for the growing character 902, the actual communication robot 30 does not make a weather forecast. Further, regarding the growing character 902, when user information of Mr./Ms. X in which his/her face image is associated with his/her name is stored and a word "Hello" is also stored, the actual communication robot 30 can recognize Mr./Ms. X and say "Hello, Mr./Ms. X" or the like. As described above, the actual communication robot 30 communicates with the user by the improved communication function of the first interaction model 100.

An example of a user experience to which the case shown in FIG. 10 is applied will be described hereinafter. A user operates a user terminal equipped with the interaction system 1 in his/her house and the actual communication robot 30 is located in an event site such as a sport stadium. The user improves the communication function of the growing character 902 by using the user terminal equipped with the interaction system 1 and thereby nurtures the growing character 902. After that, the information transmission unit 70 of the user terminal transmits first information to the actual communication robot 30. In this state, when the user (Mr./Ms. X) meets with the actual communication robot 30 in the event site, the actual communication robot 30 says "Hello, Mr./Ms. X". Then, the actual communication robot 30 supports user's activities in the event site. Further, for example, when a sport is performed in the event site and a team that the user supports is winning, the actual communication robot 30 expresses an emotion of a joy by using the emotion expression function. This expression of the emotion can be performed by having the actual communication robot 30 recognize the user's emotion from the user's expression (e.g., user's facial expression) or the like. Further, in the case in which the first interaction model 100 has already learned the name of the place of the user's home, the actual communication robot 30 autonomously says a transfer guide for the user's return trip by using the transfer guide function when the game is finished.

As described above, the information transmission unit 70 is configured to transmit first information about the improved communication function to the actual communication robot 30. As a result, the user can have such an experience that he/she communicates with the actual communication robot 30 which is physically embodied the virtual character he/she has nurtured as an actual entity. Therefore, the user can form a strong attachment to the actual communication robot 30.

Modified Example

Note that the present disclosure is not limited to the above-described embodiments and they can be modified as desired without departing from the spirit and scope of the present disclosure. For example, in the above-described flowchart, the order of a plurality of processes can be changed as desired. Further, in the above-described flowchart, one of the plurality of processes may be omitted.

Further, in the above-described embodiments, FIG. 2 shows an example in which both the first interaction model 100 (the growing character 902) and the second interaction model 200 (the supporting character 904) are implemented (i.e., virtually materialized) in the user terminal. Further, FIG. 3 shows an example in which the first interaction model 100 (the growing character 902) is implemented by the actual communication robot and the second interaction model 200 (the supporting character 904) is implemented (i.e., virtually materialized) by the user terminal. However, the method for implementing (or virtually materializing) the first and second interaction models 100 and 200 is not limited to the above-described examples. For example, both the first interaction model 100 (the growing character 902) and the second interaction model 200 (the supporting character 904) may be implemented by an actual communication robot(s). Alternatively, the first interaction model 100 (the growing character 902) may be implemented (i.e., virtually materialized) by a user terminal and the second interaction model 200 (the supporting character 904) may be implemented by an actual communication robot.

Further, in the above-described embodiments, the interaction system 1 includes one first interaction model 100 and one second interaction model 200. However, the configuration is not limited to this example. The interaction system 1 may include two or more first interaction models 100. Similarly, the interaction system 1 may include two or more second interaction models 200.

Further, the supporting character 904 does not necessarily have to be expressed to the user in the interaction system 1 at all times. For example, the interaction system 1 may not express the supporting character 904 to the user any longer after the growing character 902 (the first interaction model) has sufficiently grown (its functions have been sufficiently improved). For example, when the execution levels of all the released functions registered in the function information (FIG. 5) have become "executable" and the execution levels of all the learned functions have become "high", the interaction system 1 (e.g., the support processing unit 206) may determine that no further support is necessary.

Further, in the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An interaction system configured to communicate with a user at least through an interaction with the user, comprising a control unit having a central processing unit configured to execute at least a first interaction model and a second interaction model each of which is configured to at least interact with the user, wherein
   the first interaction model is configured so that a communication function expressed to the user is improved from an initial state through communication with the user, and
   the second interaction model is configured to interact with the user by a communication function better than the initial state of the first interaction model, and to make a speech for the user, the speech being made so as to support the improvement of the communication function of the first interaction model, wherein the speech indicates an action that the user should perform in order to improve the communication function of the first interaction model, and wherein the second interaction model is configured so that a communication function expressed to the user is not improved from an initial state.

2. The interaction system according to claim 1, wherein the second interaction model acquires a state of the first interaction model and provides a support according to the state.

3. The interaction system according to claim 2, wherein the second interaction model provides a support when it is determined that the improvement of the communication function of the first interaction model is stagnating.

4. The interaction system according to claim 1, wherein the second interaction model makes the speech for indicating the action to the user by using a character string.

5. The interaction system according to claim 1, wherein
   at least the first interaction model is implemented in the form of a virtual character in a user terminal, and
   the interaction system further comprises an information transmission unit configured to transmit information about the improved communication function of the first interaction model to an actual communication robot corresponding to the first interaction model.

6. An interaction method performed by using an interaction system comprising a control unit having a central processing unit configured to execute a first interaction model and a second interaction model, the interaction system configured to communicate with a user at least through an interaction with the user, comprising:
   implementing, with the central processing unit, the first interaction model configured so that a communication function expressed to the user is improved from an initial state through communication with the user, and
   implementing, with the central processing unit, the second interaction model configured to interact with the user by a communication function better than the initial state of the first interaction model, and to make a speech for the user, the speech being made so as to support the improvement of the communication function of the first interaction model, wherein the speech indicates an action that the user should perform in order to improve the communication function of the first interaction model, and wherein the second interaction model is configured so that a communication function expressed to the user is not improved from an initial state.

7. A non-transitory computer readable medium storing a program for performing an interaction method performed by using an interaction system configured to communicate with a user at least through an interaction with the user, the program being adapted to cause a computer to execute:
   a function of implementing a first interaction model configured so that a communication function expressed to the user is improved from an initial state through communication with the user, and
   a function of implementing a second interaction model configured to interact with the user by a communication function better than the initial state of the first interaction model, and to make a speech for the user, the speech being made so as to support the improvement of the communication function of the first interaction model, wherein the speech indicates an action that the user should perform in order to improve the communication function of the first interaction model, and wherein the second interaction model is configured so that a communication function expressed to the user is not improved from an initial state.

\* \* \* \* \*